(No Model.)
E. JUNGERMAN.
ELECTRIC ALARM FOR SPRING CLOCKS.
No. 295,873. Patented Mar. 25, 1884.
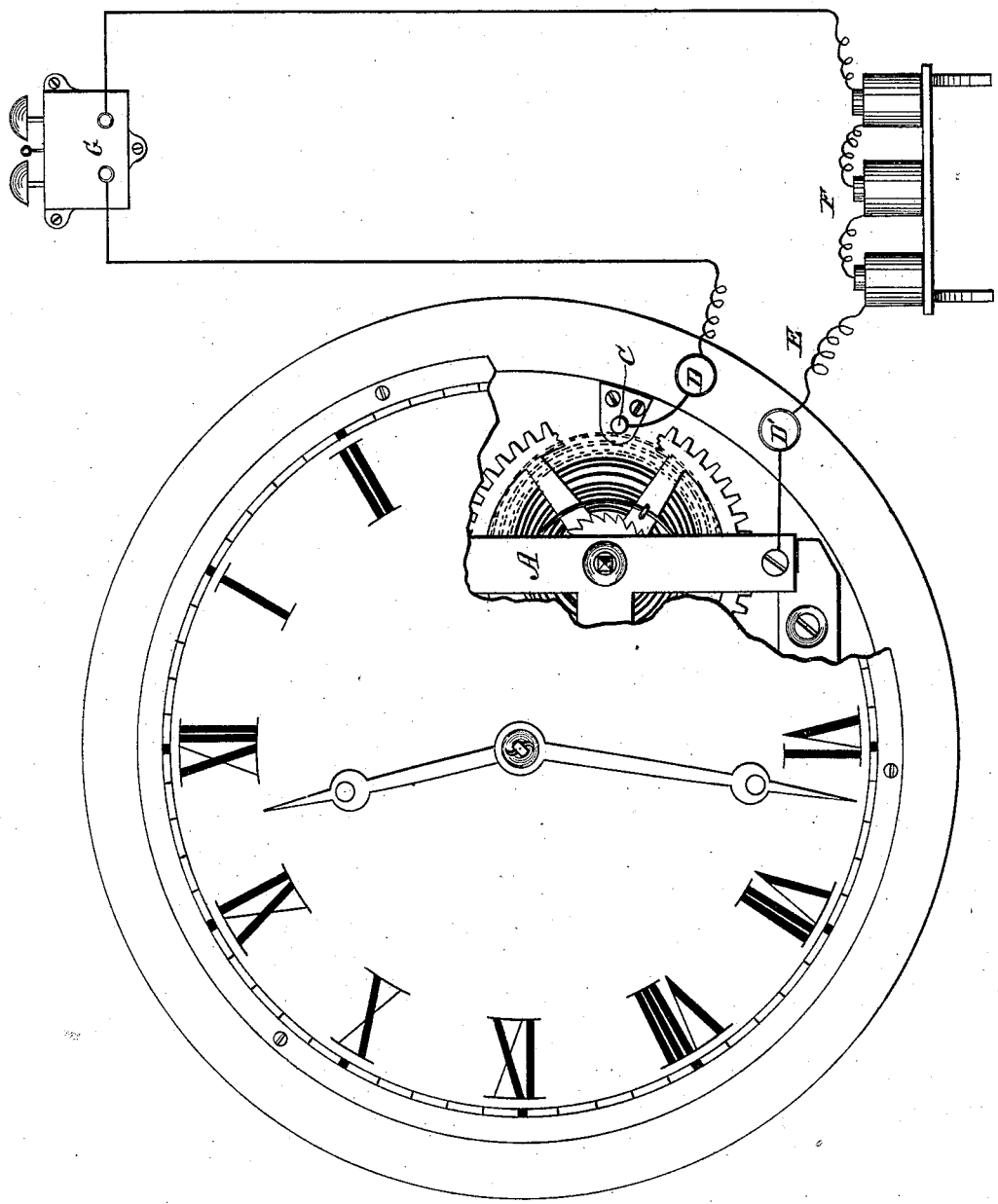
WITNESSES:
W. W. Hollingsworth
Edw. W. Byrn.
INVENTOR:
E. Jungerman
BY Munn & Co
ATTORNEYS.

UNITED STATES PATENT OFFICE.

EDWARD JUNGERMAN, OF GETTYSBURG, PENNSYLVANIA.

ELECTRIC ALARM FOR SPRING-CLOCKS.

SPECIFICATION forming part of Letters Patent No. 295,873, dated March 25, 1884.

Application filed January 18, 1884. (No model.)

*To all whom it may concern:*

Be it known that I, EDWARD JUNGERMAN, a citizen of the United States, residing at Gettysburg, in the county of Adams and State of Pennsylvania, have invented certain new and useful Improvements in Methods of Indicating the Unwound or Spent Condition of Spring-Clocks, of which the following is a description.

The figure is a view of a clock with the face partly broken away, and showing in conjunction therewith an electrical circuit with battery and bell.

In another application for a patent filed by me January 8, 1884, I have shown and described a means for indicating the spent or unwound condition of a spring-clock, which, in short, consisted in placing a yielding bar or shoe in position to be struck by the convolutions of the mainspring when at or near its greatest diameter of relaxation, which yielding bar was made to bring a signal into the range of vision on the face of the clock.

My present invention consists in the application of an electric circuit to such form of clock, with contact-points to be closed by the expansion of the mainspring, as hereinafter described, whereby an audible signal may be given on a bell or a signal given at a point remote from the clock, as hereinafter described.

In the drawings, A represents a clock-movement whose mainspring has a range of movement in unwinding from its position shown to a circumference tangential to the contact-pin C. This pin is connected electrically with a binding-post, D, on the outside of the clock, which post and pin are insulated from the metallic parts of the clock. Another binding-post, D', beside D is electrically connected with the metallic portion of the clock-frame. From these two binding-posts a circuit-wire, E, extends to the battery F, and also to an electric bell, G. Now, whenever the clock is about run down, and its mainspring has expanded, so as to make contact with the pin C, the circuit of the battery is closed through the bell, and the latter is made to give an audible signal indicating the fact that the clock needs rewinding.

I prefer to make contact by the direct bearing of the mainspring against the pin C, as the contact thus made is a rubbing or grinding contact, which makes the best electrical connection; but I may, if desired, cause the spring, in expanding, to actuate and move an intermediate switch, which in turn closes the circuit.

Instead of using a bell-signal, also, the circuit may be employed to set an index-hand or visible signal, or it may set the index-hand first, and if this escapes notice it may then ring the bell.

Having thus described my invention, what I claim as new is—

1. The method herein described of indicating the unwound or spent condition of a spring-clock, which consists in closing an electrical circuit by the expansion of the mainspring and producing an audible or visible signal, substantially as described.

2. The combination, with a clock and its mainspring, of an electrical circuit, a battery, a signal set by the battery, and contact-points, of the circuit adapted to be closed by the expansion of the mainspring, substantially as shown and described.

EDWARD JUNGERMAN.

Witnesses:
 EDW. W. BYRN,
 SOLON C. KEMON.